United States Patent [19]
Bayer et al.

[11] 3,886,245
[45] May 27, 1975

[54] METHOD FOR PRODUCING BRICKS FROM RED MUD

[75] Inventors: Gerhard Bayer, Rheinogonheim; Egon Cherdron, Limburgerhof/Pfalz; Manfred Haerter, Neuhofen/Pfalz; Ernst Hecht, Waldsee/Pfalz, all of Germany

[73] Assignee: Gebr. Giulini GmbH, Ludwigshafen, Germany

[22] Filed: Dec. 21, 1971

[21] Appl. No.: 210,508

[30] Foreign Application Priority Data
Dec. 22, 1970 Germany.............................. 2063028

[52] U.S. Cl. .................. 264/56; 106/395; 264/102; 264/148; 264/176
[51] Int. Cl. ......................................... C04b 33/04
[58] Field of Search ....... 264/56, 65, 102, 148, 176; 106/39, 39.5

[56] References Cited
FOREIGN PATENTS OR APPLICATIONS
369,181  1/1959  Japan..................................... 264/56
733,666  3/1943  Germany.............................. 264/56
1,278,321  9/1968  Germany.............................. 264/56
1,292,570  4/1969  Germany.............................. 264/56

OTHER PUBLICATIONS
Ceramic Bulletin, Vol. 50, No. 3, March 1971, p. 2a.
H. H. Nakamura et al., "Use of Bauxite Wastes For Lightweight Building Products," Ceramic Bulletin, March 1971, pp. 248–250.

Primary Examiner—Robert F. White
Assistant Examiner—Thomas P. Pavelko
Attorney, Agent, or Firm—Spencer & Kay

[57] ABSTRACT

A method for producing bricks from red mud, including mixing red mud having a water content of 15 to 35 weight-% with clay to provide a resulting mixture containing 50 to 92 weight-% red mud based on the dry weight of the resulting mixture, forming the resulting mixture at a water content of 18 to 25 weight-% into raw bricks, drying the raw bricks with heated gases at a temperature below 70°C, and burning the raw bricks at a temperature from 900° to 1000°C.

5 Claims, 1 Drawing Figure

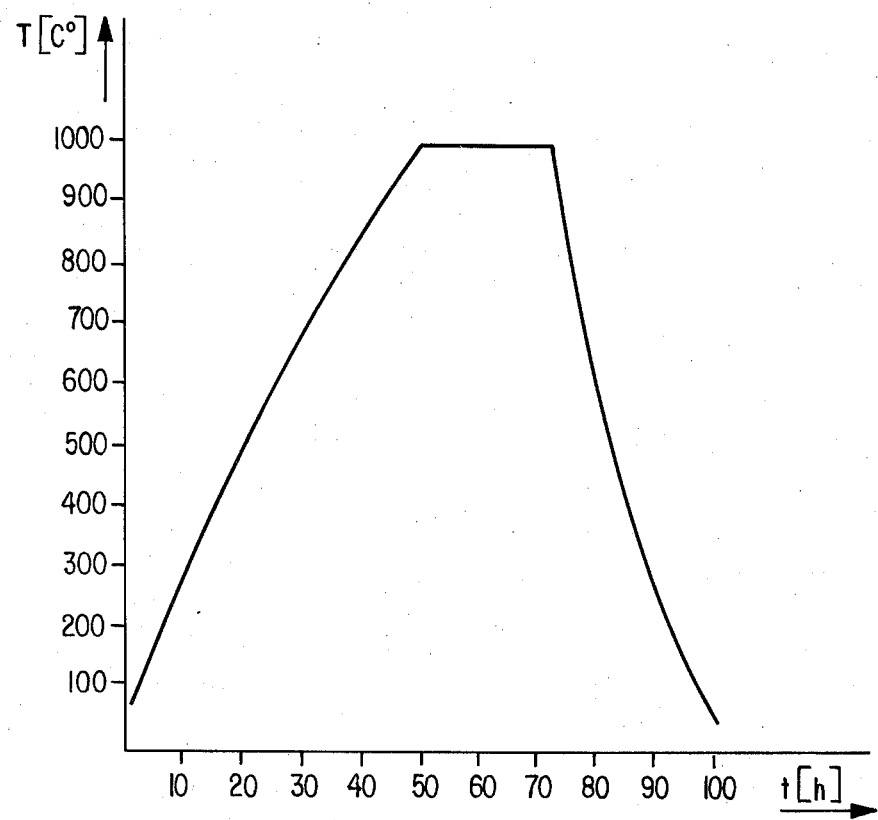

METHOD FOR PRODUCING BRICKS FROM RED MUD

BACKGROUND OF THE INVENTION

The present invention relates to a method for producing bricks, especially bricks for walls, wherein the main component is the red mud occurring as a by-product in the production of alumina from bauxite according to the Bayer process.

The Bayer process is described generally in the article "Aluminium," subtitle "Alumina Extraction," at pages 290-1, Vol. 1, of the MCGRAW-HILL ENCYCLOPEDIA OF SCIENCE AND TECHNOLOGY, McGraw Hill Book Co., N.Y. (1966).

In producing alumina from bauxite according to the Bayer process, up to two tons of filter-wet red mud, having a water content of from 40 to 50 weight-%, may be obtained for every ton of alumina produced in the process. The amount of red mud actually obtained depends on the particular composition of the bauxite, i.e., on the geographical origin of the bauxite.

With such significant quantities of red mud occurring as a by-product, many have worked to find ways to use the red mud. Among other things, people have attempted to use the red mud for making bricks. However, these attempts at brick making have not been successful, because the high alkali content of up to 10 weight-% based on the dried red mud has caused the resulting bricks to show signs of efflorescence. Moreover, considerable difficulties have been experienced even at the stage of shaping the raw (yet unfired) bricks. For example, the raw bricks have shown an unsatisfactory ability to maintain their shapes. Additionally, there has been crack formation due to high shrinkage during drying and burning. See German Published Application (Auslegeschrift) No. 1,292,570.

According to German Published Application (Auslegeschrift) No. 1,292,570, a small amount of red mud may be added to clay to provide a desired color in clay bricks. This has, however, given no solution of the problem of what to do with the enormous quantities of red mud produced by the Bayer process.

SUMMARY OF THE INVENTION

An object of the present invention, therefore, is to provide a successful method for making bricks having a high proportion of red mud in their composition.

This as well as other objects which will become apparent in the discussion that follows are achieved, according to the present invention, by a method for producing bricks from red mud, including mixing red mud having a water content of 15 to 35 weight-% with clay to provide a resulting mixture containing 50 to 92 weight-% red mud based on the dry weight of the resulting mixture, forming the resulting mixture at a water content of 18 to 25 weight-% into raw bricks, drying the raw bricks with heated gases at a temperature below 70°C, and burning the raw bricks at a temperature from 900° to 1,000°C.

BRIEF DESCRIPTION OF THE DRAWING

The sole FIGURE of the drawing is a graph of brick oven temperature versus time for the burning of the bricks of the Example.

DESCRIPTION OF THE PREFERRED EMBODIMENTS

It has been discovered that red mud mixed with a small amount of clay can be formed into form-stable raw bricks which show no subsequent tendency toward efflorescence, if the red mud is first dried to a water content of 15 to 35 weight-%, preferably 20 to 25 weight-%, based on the dry weight of the red mud, if the thus-dried red mud is then mixed in quantities of 50 to 92 weight-%, preferably 70 to 90 weight-%, based on the dry weight of the resulting mixture, with clay, if the resulting mixture is then formed into raw bricks while at a water content of 18 to 25 weight-%, based on the dry weight of the mixture, and if the raw bricks are then dried with heated gases at a temperature below 70°C and finally burned at a temperature from 900° to 1,000°C. Depending on the amount of water in the clay used, it may be necessary to add water in order to attain the water content of 18 to 25 weight-%.

The present invention is based on the discovery that the chemical bonding of the free alkalis (their going into a glassy phase) in red mud is obtained at a low temperature of 900° to 1,000°C when the red mud has been dried to the above-noted water content values and has been mixed with at least 8 weight-% clay, as based on the dry weight of the mixture. At these temperatures of 900° to 1,000°C, no softening is experienced, so the resulting brick accurately retains the shape given the raw brick. And, as a result of the chemical bonding of the free alkalis, the resulting brick shows no evidence of efflorescence.

This discovery, that it is possible to make high quality bricks containing 50 to 92 weight-% red mud, was unexpected and surprising in view of the state of the art. It was to be expected that the higher red mud quantities would lead to the above-described shrinkage and crack formation.

It was also surprising to discover that when red mud is mixed in quantities above 50 weight-%, as based on the dry weight of the resulting mixture, with clay, and the water content of the red mud charged to the mixing process has been earlier brought below 15 weight-%, as based on the dry weight of the red mud, then it is not possible to form shape-stable raw bricks from the resulting mixture. It appears that red mud dried below 15 weight-% water content loses its ability to contribute to green strength in the resulting red mud/clay mixture. It was not to be expected that the residual water content of the red and charged to the mixing process would be a critical factor in the success of the method of the present invention for producing bricks. Mixtures according to the present invention are easily formed into raw bricks, and the resulting raw bricks exhibit a high green strength. No contraction and shrinkage cracks are experienced.

The upper residual water content of 35 weight-% in the red mud is likewise important for the success of the present invention. If the parameters of the present invention are varied by mixing with the clay a red mud having a residual water content above 35 weight-%, there is noted especially after burning a marked shrinkage and crack formation.

The drying of the red mud can be carried out in conventional equipment used for drying similar mud-like material. For example, the drying can be accomplished in a rotary kiln containing hanging chains such as illustrated and described on page 20–22 of PERRY'S CHEMICAL ENGINEERS' HANDBOOK, 4th Ed., McGraw-Hill Book Co., New York (1963); or it can be accomplished in a turbo-tray dryer such as illustrated and described on pages 20–33 to 20–35 of the same handbook. The drying must be carried out without bringing spots in the charge below the 15 weight-% water content value. The exhaust gases from the oven used for burning the bricks in the method of the present invention can be used as the drying gases in the dryer.

The mixing of the partially dried red mud with the clay can be carried out in conventional manner in screw mixers, roll mills, muller mixers, and the like. The forming of the raw bricks can be effected using extruders conventionally used for brick manufacture; compression pressures between 8 and 12 atmospheres gage pressure have proven especially advantageous. For certain purposes, it can also be helpful to carry out the pressure-forming in vacuum, i.e., at air pressure reduced substantially below atmospheric pressure.

The method of the present invention has made possible for the first time, and in the face of the contrary opinion of the art, the manufacture of bricks containing preponderant quantities of red mud. Since these bricks exhibit an excellent strength, the present invention represents an economical route for taking care of a previously troublesome by-product of the chemical industry.

It is important to emphasize this, because, in spite of wide ranging investigations, those skilled in the art have continued to express the opinion that a general and economical use for red mud is yet to be found. See, for example, pages 390 to 392 of the "Chemiker-Zeitung," Vol. 82 (1958).

Further illustrative of the invention is the following example:

EXAMPLE

Filter wet red mud having a water content of 42 weight-% is charged by means of a pump into a hanging-chain rotary kiln which is heated directly using oil. This red mud has the following composition, based on the dry weight of the substance: 25 weight-% $Fe_2O_3$, 25 weight-% $Al_2O_3$, 17 weight-% $SiO_2$, 11 weight-% $Na_2O$ with 1.5 weight-% being in water soluble form and 9.5 weight-% being in water insoluble form, 6.8 weight-% $TiO_2$, and 2.9 weight-% CaO. The red mud leaves the dryer with a residual water content of 23.7 weight-%. This red mud is put, together with clay, into a bin-feeder with withdrawal belt in the proportions 91.8 tons of the dried, 23.7 weight-% water content red mud and 35.7 % tons of clay having a water content of 16 weight-%.

The mixture is then fed through two roll-mill mixers to provide a complete homogenization of the components. From the roll-mill mixers, the mixture is continuously fed into an extruder including a double-screw mixer at its intake. The extruder is a Ziegelpresse Victoria of K. Handle, 7130 Muhlacker, Germany.

The mixture is evacuated at a vacuum of from 600 to 700 mm Hg below atmospheric and then extruded by a maximum pressure of 10 atmospheres gage pressure and the extrusion is cut at appropriate lengths into raw bricks.

| The dimensions of the bricks: | moist | burned |
|---|---|---|
| length | 24.6 cm | 23.6 cm |
| breadth | 11.5 cm | 11.3 cm |
| height | 7.1 cm | 7.0 cm |

The raw bricks are conveyed into a dryer which has gases heated to a temperature of 45°C flowing into it. When the gases leave the dryer, their temperature has decreased to 32°C.

The dried raw bricks leave the dryer with a residual water content of 1 weight-% and are then burned to bricks in a brick oven at a temperature of 950°C. Wall bricks produced in this manner had a compressive strength, as measured according to DIN (German Industrial Standard) 105, of over 400 kiloponds/cm$^2$, and consequently lay in the highest quality class.

According to X-ray diffraction studies, the bricks of this Example have essentially the following phase composition:

| | |
|---|---|
| Nepheline (Na,K) $AlSiO_4$ | 23 to 30 weight-% |
| Glass having a composition of nepheline + anorthite in the weight ratio of about 1 : 1 | 26 to 34 weight-% |
| Pseudobrookite, $Fe_2TiO_5$ | 13 to 16 weight-% |
| Hematite, $Fe_2O_3$ | 11 to 13 weight-% |
| Quartz, $SiO_2$ | 2 to 7 weight-% |
| Rutile, $TiO_2$ | 2 to 3 weight-% |

For a composition of this type, it is recognized that no reactions with substances in the atmosphere are to be expected.

Chemical analysis of bricks of this Example burned at different temperatures between 900° and 1,000°C shows, as evident from the following table, that their soluble salt content is so low that there is no danger of efflorescence. For a total content (water soluble and water insoluble) of $SO_3$ equal to 0.4 weight-%, the water soluble, efflorescible $SO_3$ content is only 0.04 weight-%.

| Burning Temp. °C | Water Soluble $Na_2O$ wt.-% | Water Soluble $SO_3$ wt.-% | Total $SO_3$ wt.-% |
|---|---|---|---|
| 800 | 0.40 | 0.10 | 0.4 |
| 900 | 0.30 | 0.05 | 0.4 |
| 1000 | 0.10 | 0.01 | 0.4 |

Ordinary commercial wall bricks have, in contrast, a content of up to 0.4 weight-% water soluble $SO_3$.

The clay for the Example comes from the clay deposits near the city of Grunstadt, Rheinland-Pfalz, Germany. The crystallographic composition of this clay is kaolinite. Kaolinite is preferably used, but also other kinds of clays are usable. The bauxite of the Example is an Australia-bauxite and has the crystallographic identity of hydrargillite. Instead of Australia-bauxites, European bauxites alone or in mixture can be used.

The Bayer process is a continuous process and is performed at 180°C at a pressure of 8 atmospheres. The leaching liquor for extraction contains about 280g $Na_2O/l$ after the extraction, the suspension is concentrated and the red mud is separated from the solution by a rotary drum-filter.

A definite composition of the red mud is not necessary. It has been found that all red muds, occuring as a by-product in the production of alumina from bauxite according to the Bayer process, are usable.

It will be understood that the above description of the present invention is susceptible to various modifications, changes and adaptations, and the same are intended to be comprehended within the meaning and range of equivalents of the appended claims.

We claim:

1. A method for producing bricks from red mud containing free alkali wherein no softening occurs during firing of the bricks, comprising mixing red mud having a residual water content of 15 to 35 weight-%, based on the weight of dry red mud, with a clay which can chemically bond with and vitrify the free alkali in the red mud to provide a resulting mixture containing 50 to 92 weight-% red mud based on the dry weight of the resulting mixture, forming the resulting mixture at a water content of 18 to 25 weight-% based on the dry weight of the mixture by extrusion molding into raw bricks, drying the raw bricks with heated gases at a temperature below 70°C, and burning the dried raw bricks at a temperature from 900° to 1,000°C.

2. A method as claimed in claim 1, wherein the residual water content of the red mud is 20 to 25 weight-%, and wherein the resulting mixture contains 70 to 90 weight-% red mud.

3. A method as claimed in claim 1, wherein the resulting mixture is subjected to a compression pressure of 8 to 12 atmospheres gage pressure during the extrusion molding.

4. A method as claimed in claim 3, further including applying a vacuum during the step of forming.

5. A method as claimed in claim 1 wherein the clay is kaolinic.

* * * * *